United States Patent [19]

Schermerhorn

[11] 3,875,472

[45] Apr. 1, 1975

[54] METHOD OF AND SYSTEM FOR LIGHT PEN READ-OUT AND TABLET WRITING OF MULTICELLED GASEOUS DISCHARGE DISPLAY/MEMORY DEVICE

[75] Inventor: Jerry D. Schermerhorn, Swanton, Ohio

[73] Assignee: Owens, Illinois, Inc., Toledo, Ohio

[22] Filed: June 29, 1973

[21] Appl. No.: 375,083

[52] U.S. Cl.. 315/169 TV, 315/169 R, 340/173 PL, 340/324 M

[51] Int. Cl. .................................. G11c 7/00

[58] Field of Search .................. 315/169 R, 169 TV; 340/173 PL, 324 R, 324 M; 178/18, 19

[56] References Cited

UNITED STATES PATENTS

| | | | |
|---|---|---|---|
| 3,559,190 | 1/1971 | Bitzer et al. | 315/169 TV |
| 3,651,509 | 3/1972 | Ngo | 340/324 M |
| 3,796,997 | 3/1974 | Johnson et al. | 340/173 PL |

*Primary Examiner*—Rudolph V. Rolinec
*Assistant Examiner*—E. R. LaRoche
*Attorney, Agent, or Firm*—Donald Keith Wedding

[57] ABSTRACT

Identification of coordinates of a region of a display device and the discharge state of that region is accomplished by means of a randomly positionable light detector and appropriate controls for selectively and non-destructively altering the discharge state of discharge sites in the device. A device offering spatial discharge transfer between discharge sites of individual cells such that if any site of a cell is in the "on state" of discharge the remaining sites of that cell will be transferred to an "on state" has its cell coordinates scanned by transferring a portion of the "on" sites of a cell to an off state to emit a localized light pulse while the cells of the device are otherwise in a non-light-emitting state. The light detector is gated only during that non-light-emitting state for successive cycles of operation in which the cell matrix is scanned with partial "turn off" signals and marks the scan area at the moment the detector responds to the light emitted by the turn off discharge. Since only a portion of a cell is erased, the remainder thereof retains its original state and that memory retaining remainder restores the erased portion to an on state of discharge, the readout by this light detector is non-destructive of the cell memory. Off state cells can be detected by inverting the discharge state of the panel and scanning cells by partial turn off signals. Increased speed of scan is achieved by actuating blocks of the cell matrix and localizing the region to be scanned in detail.

23 Claims, 5 Drawing Figures

METHOD OF AND SYSTEM FOR LIGHT PEN READ-OUT AND TABLET WRITING OF MULTICELLED GASEOUS DISCHARGE DISPLAY/MEMORY DEVICE

CROSS-REFERENCE TO RELATED APPLICATIONS

The discharge device with which this application is illustrated is disclosed in the U.S. Patent application of Jerry D. Schermerhorn entitled "Spatial Discharge Transfer Gaseous Discharge Display/Memory Panel", Ser. No. 372,730 (Case S-12404), and an operating method and system for that device as employed in part in realizing the method and system of this application is set forth in the United States Patent Application of Jerry D. Schermerhorn entitled "Method of and System for Introducing Logic Into Display/Memory Gaseous Discharge Panels by Spatial Discharge Transfer" Ser. No. 372,542 (Case S-13151), both of which were filed June 22, 1973.

BACKGROUND OF THE INVENTION

Multicelled gas discharge devices as display and/or memory units have been proposed in the form of a pair of opposed dielectric charge storage members which are backed by electrodes, the electrodes being so formed and oriented with respect to an ionizable gaseous medium as to define a plurality of discrete gas discharge cells. Charged particles (electrons and ions) produced upon ionization of the gas volume of selected discharge cell, when proper alternating operating voltages are applied between opposed electrodes, are collected upon the surface of the dielectric at specifically defined locations and constitute an electrical field opposing the electrical field which created them. Those collected charges aid an applied voltage of the polarity opposite that which created them so that they aid in the initiation of another discharge by imposing a total voltage across the gas sufficient to again initiate a discharge and a collection of charges. This repetitive and alternating charge collection and ionization discharge constitutes an electrical memory of a cell in the "on state" of discharge. With properly chosen values of the alternating voltage, cells in the "off state" of discharge remain in that state during the alternations hence that state is also retained in electrical memory.

The alternating voltage offering the above memory characteristics is termed a sustaining voltage. For a given device it usually has a range of values.

Change of the state of individual cells in a device subject to a sustaining voltage has been accomplished by superimposing voltage pulses on the sustaining voltage. Cells in an off state of discharge have been turned on by pulses, usually applied to the opposed electrodes of the selected cell, which raise the voltage imposed across the gas to a level which initiates an ionization discharge of a magnitude to cause sufficient charged particles to collect on the dielectric surface of the cell to cause a repetition of the discharge by virtue of the augmentation of the reversed sustainer voltage with the wall charge voltage. Cells in the on state of discharge are selectively manipulated to the off state by applying a voltage pulse across the selected cell in opposition to the currently applied sustainer and of a magnitude sufficient to discharge the wall charge without developing an opposite wall charge at the on state level. In each of a "turn on" discharge and a "turn off" discharge a burst of light is emitted over a very short portion of the sustainer half period. For example, where the sustainer is applied at a typical 50 kilohertz the light burst of kilohert, state cells may be of about 500 nanoseconds in the initial transition portion of each 10 microsecond half cycle where essentially a square wave form is imposed.

The display offered by matrices of cells in prior devices has comprised patterns of bright and dark areas since the eye integrates the light bursts of each half sustainer cycle for a cell in the on state as continuously on.

Cell matrices have been operated with the display characters as bright patterns on a darker field or as darker patterns on a bright field. Techniques for shifting between these conditions are known as cell matrix inversion. They comprise transferring the discharge state of all discharge sites in a cell matrix by a suitable shift in the sustainer voltage levels relative to the wall voltage on the cells. The sustainer voltage is shifted to a level at which the wall voltage of a cell which is in an on state of discharge while subject to the regular sustainer voltage levels is at an off state level relative to the shifted sustainer. An off state cell wall voltage relative to the regular sustainer voltage levels is at an on state cell level relative to the levels of the shifted sustainer. The inversion process by sustainer shifts is reversible, that is by return to the regular sustainer levels at appropriate instants in the shifted sustainer voltage cycle the originally on cells are returned to an on state and the originally off cells are returned to an off state. Thus the device memory of information displayed and stored therein can be retained through inversion and reinversion of its cell matrix.

In the aforementioned patent applications there is disclosed a form of gas discharge display/memory device wherein cells are made up of a plurality of discharge sites so related spatially that the existence of an on state of discharge in one or more sites of a cell causes all sites in the cell to be transferred to an on state. Conversely the sites in each cell are spaced sufficiently so that the transfer of a site to an off state of discharge while any other site of the cell is in an on state of discharge will not cause that on cell to turn off. Cells are so spaced in the cell matrices of these devices that the discharge state of a site of one cell will not alter the discharge state of any site in any other cell. Typically the cells are made up of four discharge sites defined by two parallel conductors 3 mils wide separated by 3 mils in one conductor array and two parallel conductors 3 mils while separated by 3 mils in the other array. In the typical matrix of cells the conductor pairs are spaced on 16 mil centers and the arrays are orthogonally related. The discharge sites are in the area of the cross points of conductors of opposed arrays as viewed along common perpendiculars to the arrays. Since such discharge sites are components of a cell, they have been termed "sub sites".

Heretofore techniques have sought to identify coordinates on the matrix of a gas discharge display/memory device from the device face. Such identification for cathode ray tubes has found useful application as where a tube is means for a computer and it is desired to augment or amend the display and thus the computer source signals. Another objective has been to identify the state of a particular matrix coordinate as between an on state of discharge and an off state of discharge. Where identifications of coordinates and/or state are made it is desirable to avoid destruction of the information retained at that location.

SUMMARY OF THE INVENTION

In accordance with the above desiderata the present invention involves a system for and method of operating a multicelled gas discharge display/memory device and identifying selected coordinates and the discharge state at those coordinates without loss of the display/memory at those coordinates. More particularly, the method involves altering the discharge state of a cell in a matrix while retaining the ability to restore that state and detecting the altered state. In practice a scanning process is employed to selectively alter cell states and the response to detection of an altered state in the area interrogated indicates the location of the scan is coincident with the interrogated area.

A system for practicing the method of coordinate identification includes a multicelled device of the spatial discharge transfer type controlled by means which erases less than all of the sub sites of a cell in the on state to generate a light burst during the normally non-light emitting interval, that interval of each half sustainer period in which the light burst of an on state cell discharge is absent. A light pick-up having a limited area response field is positioned on the display area of the cell matrix and applies the light picked up to a detector gated to respond to light bursts only during the normally non-light emitting interval of each half sustainer period. Controls selectively scan the matrix with erase signals for less than all sub sites of a cell, termed "non-destructive erase signals", issued during the normally non-light emitting interval. Marker means mark the scan position of the normally non-light emitting interval non-destructive erase signal in response to the detection of the erase discharge. Since less than all on sub sites of the scanned cells are erased, the erased sub sites are restored to an on state during the next half period of the sustainer by virtue of the control through spatial discharge transfer of the off sub sites by the on sub sites.

The method of cell coordinate identification is applied to cells in the on state of discharge in the above example. It is desirable to identify off state cells as well as those in an on state. Inversion of the cell matrix is utilized for this purpose. The scan can therefore require two scans of the matrix, one with normal sustainer levels and one with sustainer levels shifted for inversion. Identification of the state of discharge of the interrogated cell is achieved by correlating the sustainer level with the cell detection.

Large matrices can be scanned expeditiously by employing course block scans to identify the area in which a cell is located and then employing a fine scan of the block or section indicated. Further efficiencies in scan time are achieved by effective device connections whereby groups of paired conductor lines are scanned in each coordinate of the array, provided the individual conductors of those lines have been appropriately connected. Each line can be defined by a unique combination of inputs where the number of inputs and thus line groups is less than the number of lines. For example, 512 lines can be uniquely controlled from 33 sources of signals and uniquely defined in 33 groupings of conductors where the maximum number of unique combinations of conductors taken two at a time is utilized. This is in accordance with the formula $l = [n(n-1)]/2$ since 33 elements can be grouped two at a time in 528 different combinations. The 512 lines has been chosen as a convenient accommodation to a nine bit binary code.

DESCRIPTION OF THE PREFERRED EMBODIMENTS

Figure 1:
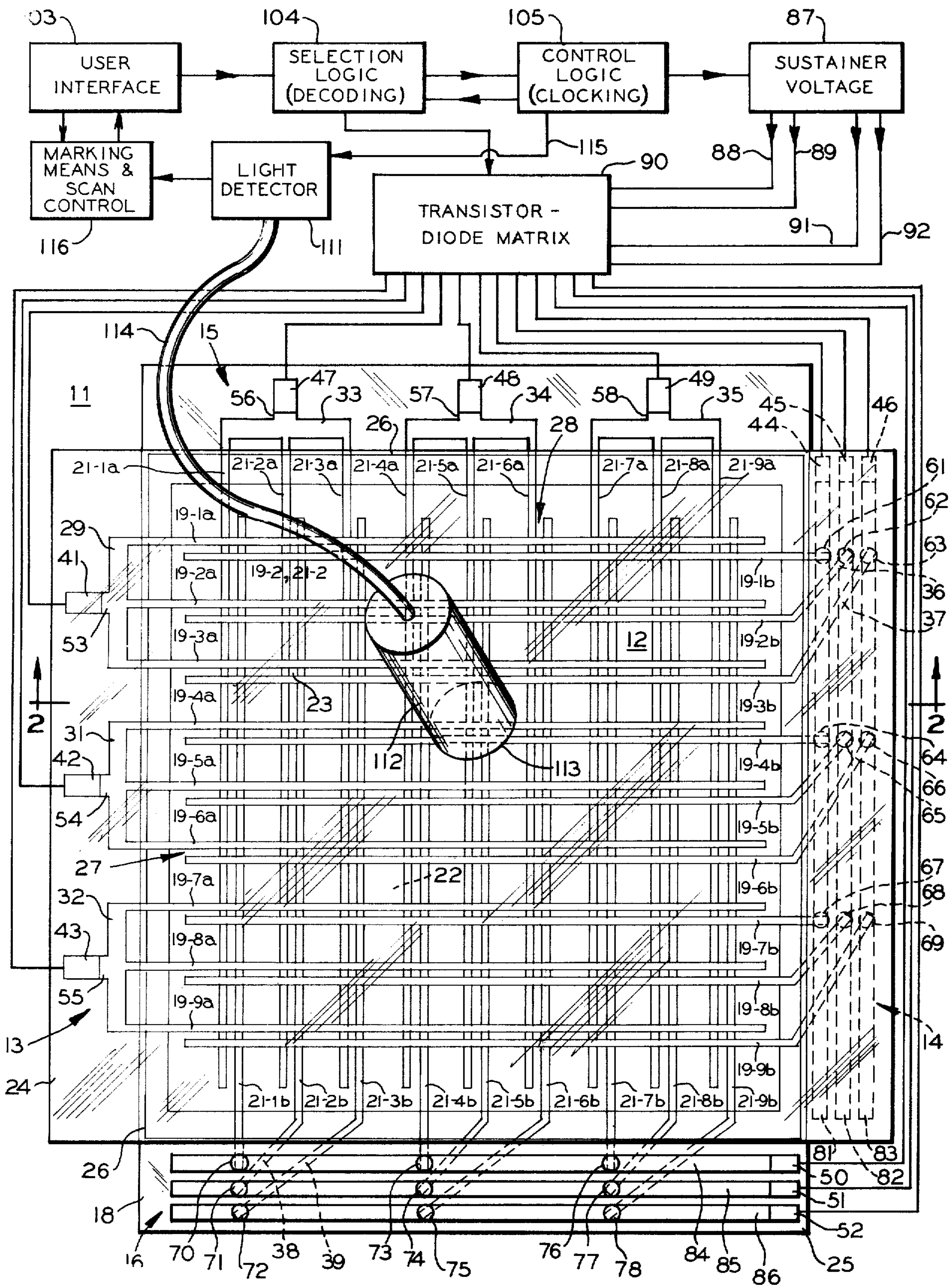
FIG. 1 is a diagrammatic representation of a display panel having a cell matrix of nine by nine cells and including a block diagram of the controls for the panel, together with a light detector and its associated block diagrammed circuits as associated with the panel controls and connections to a computer.

A multicelled gas discharge display/memory device 11 in the form of a panel having a display area 12 and terminal strip regions 13, 14, 15 and 16 is shown in FIG. 1. As in prior art devices the panel is basically in the form of a pair of opposed dielectric charge storage members, layers 17 and 18, which are backed by electrodes 19 and 21, the electrodes being so formed and oriented with respect to an ionizable gaseous medium 22 as to define a plurality of discrete gas discharge sites 23. More particularly, the electrodes 19 are arranged in an array, which in the orthogonal relationship chosen for illustration of the invention, comprises straight, parallel bands of conductive material, designated *x* conductors of an *x* array and the electrodes 21 are similar *y* conductors of a *y* array. While only a single charge storage member such as a dielectric layer 17 separating one array from the ionizable gas 22 is required for operation, it is common to provide such a layer for each array.

The gas volume 22 is thin, usually under 10 mils and typically about 4 to 6 mils in thickness. It is of a nature to produce a copious supply of charges (ions and electrons). These charges are alternately collectable on the surface of the dielectric members at opposed or facing elemental or discrete areas defined by the conductor arrays on the non-gas contacting sides of the dielectric layers 17 and 18.

The electrically operative members, dielectric layers 17 and 18, electrodes 19 and 21, and gas 22, are all relatively thin (being exaggerated in thickness in the drawings). They are formed on and supported by rigid, non-conducting support members 24 and 25 respectively. One or both of the non-conductive support members pass light produced by discharges in the discharge sites in the gas volume unless only the memory function is utilized, in which case they can be opaque.

Advantageously members 24 and 25 are transparent glass, typically about one-eighth to one-fourth inch thick.

The display area 12 of the panel is ordinarily hermetically sealed to enclose the gas volume by a wall which also establishes the volume thickness as a spacer 26 which may be of the same glass material as dielectric layers 17 and 18, and may be an integral rib or bead formed on one of the layers 17 or 18 or directly on the support member 24 or 25 and fused to the other layer or member.

Conductor arrays 27 and 28 may be formed in situ on support members 24 and 25 for the $x$ and $y$ arrays respectively, for example as individual conductor strips about 8,000 angstroms thick, and may be transparent, semitransparent, or opaque conductive material such as tin oxide, gold or aluminum. In the illustrated arrays at least one array is made up of grouped, parallel, straight conductors, typically 3 mils wide spaced 3 mils apart in the group and 7 mils apart between groups. Specifically, the conductor ribbons 19 and 21 have been shown as paired in their groupings in a manner to provide spatial discharge transfer in the panel. The dimensions of the conductors, their intragroup spacing and their intergroup spacing are not restricted to the above values since there is a range of such dimensions which is dependent upon the gas thickness, composition and pressure as well as the conductor dimensions in order to achieve spatial discharge transfer between discharge sites grouped, by virtue of conductor groupings, into cells. The spatial discharge transfer is attributed to fringing of the discharge effects beyond the shadow area of the conductor cross points between the $x$ and $y$ arrays when viewed along a common perpendicular to each of the arrays. One form of display panel having a neon-krypton or neon-argon gas atmosphere, with neon about 99.7% by weight, at about atmospheric pressure and a thickness of 4.5 to 4.7 mils exhibits spatial discharge transfer between conductors of an array spaced up to 5 mils apart without interaction between conductors 7 mils apart, depending somewhat on the size of the conductors and the thickness of the dielectric overcoat.

A lower limit exists for conductor spacing in an array if useful turn off characteristics of grouped discharge sites are to be realized. When the conductor edges are too close, the discharge region of one extends into the region of influence of its grouped companion sites whereby an erase signal imposed on less than all sites of a group draws enough charge from the walls of those sites not subject to erase signals to transfer them to an off state of discharge. Discharge sites grouped to provide spatial discharge transfer are treated as discrete cells and the sites which make-up those cells are termed sub sites. In the arrays employing paired conductors the conductors in a pair should be conductively isolated from each other, and so spaced from each other and the sub site electrode areas of the one or more conductors of the opposite array as to be adapted to initiate an on state of discharge in a discharge sub site including one of the first and second conductors of the pair which is in an off state of discharge in response to an on state of discharge in the discharge sub site of the other and the first and second conductors. Those conductors should be spaced from each other sufficiently so that their sub sites will maintain an on state of discharge when other sub sites of the group are transferred to an off state of discharge.

Discharge device 11 is operated by applying an alternating sustainer voltage between the $x$ array 27 and the $y$ array 28. A range of voltage differences exist in which cells placed in the on state of discharge remain in that state and cells in the off state of discharge remain in the off state. This is attributed to the development, for discharge site in the on state, of a wall voltage on the surface of the dielectric layers 17 and 18 by virtue of charge collected on those areas in the general area of the cross point of conductors of opposed arrays when viewed along a common perpendicular to those arrays. That wall charge is of a neutralizing polarity as it develops, hence, on reversal of the applied voltage it augments the sustainer voltage to a level causing a discharge, thereby providing a memory of the on state and the emission of light.

A matrix of cells can be inverted in its discharge state by a shift in the sustainer level. The inverting shift involves placing the sustainer voltage at a level relative to the wall charge voltage of the cells which were in an off state of discharge such that the voltage of that wall charge augments the sustainer voltage to impose sufficient voltage across the cells to ignite a discharge. The sustainer shift should be in a direction to place the wall voltage of cells in an on state of discharge at an off state voltage level relative to the new sustainer voltage.

The discharge state of individual sub sites of a cell matrix can be manipulated by address pulsers which superimpose voltages on selected cells which are coordinated with the sustainer voltage levels then effective on those cells. The discharge state manipulating signals which are applied to the conductors of the opposed arrays are termed "partial select" signals. "Write" or turn on partial select signals when applied to the electrodes of opposed arrays whose cross points viewed along a common perpendicular to the arrays define the discharge site, are imposed at a time they augment the sustainer voltage across the site. Thus a site in the off state of discharge is turned on by increasiang the voltage across the selected site to or above the value required to initiate an on state of discharge in that site. A turn off or erase partial select is imposed on each electrode of opposed arrays of an on site which defines the selected site to oppose the sustainer voltage then effective on that site. An erase signal initiates a discharge and draws off the on state wall charge while avoiding an accumulation of charged particles on the opposite site walls sufficient to support an on state of discharge. A sustainer voltage can be applied to gas discharge display/memory devices with assymetric sustainer components applied to the respective opposed arrays. Where such components are periodic pulsations of appropriate value and can be interchanged between arrays, the discharge state of selected cells of the device can be controlled only with erase partial select signals by inverting the discharge state of cells in the matrix and, while inverted, erasing the cells desired to be written. Upon reinversion of the cell matrix, the erased cells appear in an on state of discharge. Written cells can be erased by partial selects during normal sustainer operation.

As disclosed in greater detail in the aforenoted patent applications, spatial discharge transfer between sub sites of a discharge cell having proximate conductor portions in one or both of its opposed conductor arrays lends itself to logic functions internal of the device. Such logic functions can be achieved by inverting the device cell matrix discharge state and turning on cells off. A coincidence of off manipulating signals must be imposed on all sub sites of a cell to turn off that cell if it is arranged for spatial discharge transfer. If any of a cell's sub sites remains in an on state of discharge, that sub site will initiate an on state in the remainder of the cell sub sites. This coincidence requisite for turn on is employed as an AND function in the addressing of cells in the matrix with a resultant reduction in the number of manipulating signal sources required to address selected cells. That is, a manipulating signal source can be connected to a number of parallel array conductors which provide by their portions proximate with similar portions of other conductors in their array and in the opposed array, the effective electrodes of the discharge sub sites of each cell. Such parallel connections can be combined so that each cell is controlled by a unique combination of manipulating signal sources and thus, by appropriate selection and control logic, can be individually addressed.

Figure 2:
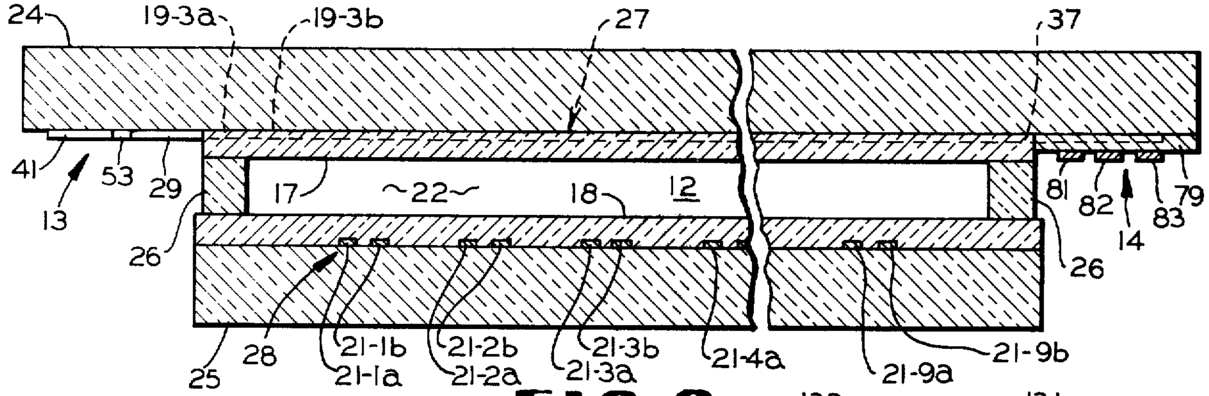
FIG. 2 is a broken section of the panel of FIG. 1 taken along line 2—2 of FIG. 1, enlarged but not to proportional scale since the thickness of the gas volume, dielectric and conductor arrays have been enlarged for purposes of illustration.

A system for operating a gas discharge device offering spatial discharge transfer between sub sites of cells in a matrix of cells each of multiple sub sites is shown in FIG. 1. That system is illustrated for operation with assymetrical sustainer components which are interchangeable on the conductor arrays 27 and 28 of the device and have erase partial select signal sources and selectively operated controls for those sources. Efficiency of utilization of select signal sources and simplification of connections between the device and its energizing and controlling circuits is realized by forming the device during the manufacture of its conductor arrays with interconnections to groups of those conductors connected in parallel integral with the device for control from a single discharge signal manipulating source. Such interconnections can be formed on terminal strip regions 13, 14, 15 and 16 at the ends of the conductors of the respective arrays 27 and 28. As shown in FIGS. 1 and 2, the device 15 is a panel made up of paired *x* conductors 19 of array 27 and paired *y* conductors 20 of array 28 in a nine line by nine line cell matrix. Each conductor pair has been designated by a numbering system originating in the upper left corner of the array with the paired lines designated as 19-1 ... 19-9 for *x* conductors 19 and 21-1 ... 21-9 for *y* conductors 21. In addition, each conductor is considered as an *a* set or *b* set conductor so that the cell which is in the second *x* and *y* line is 19-2, 21-2 and its sub sites are designated by their proximate conductor portions as 19-2*a*, 21-2*a*; 19-2*b*, ,21-2*a*; 19-2*a*, 21-2*b*; and 19-2*b*, 31-2*b*.

Parallel connections are made to sets of conductors of adjacent pairs in groups of three, in the example, and to sets of conductors of every third pair in each array. In the illustration each array conductor which is paired with another to form elements of a line of cells can be considered a "half line" and the arrays can be considered as three groups of three parallel connected half lines of adjacent lines of cells and three groups of parallel connected half lines spaced every three lines of cells. In the *x* array 27 the *a* sets are paralleled by display connector lines 29, 31 and 32 for 19-1*a*, and 19-1*a*, 19-2*a* and 19-3*a*; 19-4*a*, 19-5*a* and 19-6*a*; and 19-7*a*, 19-8*a* and 19-9*a* respectively. Adjacent pairs have their *a* conductors paralleled in the *y* array 28 by display connector lines 33, 34 and 35. The other sets of conductors of each array are connected through cross overs provided to extensions of the array lines which are aligned parallel to the length of the conductors by a linear extension of one inductor and oblique extensions 36 and 37 of the other two in the *x* array and 38 and 39 in the *y* array.

Panel edge terminals 41 through 46 and 47 through 52 provide means for connecting 12 discharge state manipulating signal sources to the conductors of the array. Conductive strips coupling sections 53 through 58 of the display connector lines formed on the substrates 24 and 25 with the display connector lines 29, 31 and 32 and 33, 34 and 35 couple those lines to terminals 41, 42 and 43 and 47, 48 and 49 respectively. In practice, the display connector lines interconnecting sections, strip coupler sections of the lines, and terminals can be formed at the same time the conductive lines of the array are formed, for example by vacuum deposition of a conductive film through suitable masks. It is desirable that the capacity carrying capacitty of display connector lines and strip coupler sections be adequate and accordingly they are made wider than the conductors in the array, typically about three times as wide or 9 mils.

The substrates 24 and 25 with their conductive elements thereon are then covered with a dielectric layer 17 and 18 at least in the display area 12. This dielectric layer can also be extended over the terminal strip regions 13, 14, 15 and 16, particularly the region of the display connector lines, both in the array conductor interconnection and terminal coupler sections. The terminal 41 through 52 should be free of dielectric to facilitate connection to external circuits. The terminals can have additional elements in the form of metal foil overlays (not shown) applied to protect the deposited film and make a more rugged connection.

In the case of the conductors which are not interconnected on the surface of the substrate due to the requirement that a system of cross-overs be provided to produce a unique combination of each pair of array conductors, the oblique extensions of the array conductors are covered with a dielectric layer such as layers 79 and 80 if layers 17 and 18 are not applied in those areas. Apertures 61 through 78 in the dielectric layers located in registry with the conductor extensions across the terminal strip region of the substrates 24 and 25 afford access to those extensions for electrical connections in the form of conductive strips 81, 82 and 83 for the *b* conductors of the *x* array and 84, 85 and 86 for the *b* conductors of the *y* array. Conductive strips 81 and 86 can be formed in situ by suitable deposition techniques such as vacuum deposition through masks such that the strips form continuously along the walls of the apertures 61 through 78 to conductively engage the array conductor extensions. Apertures 61 through 78 can be formed by localized photoetching and/or chemical etching of the dielectric layer. Other techniques of forming apertures through layers 79 and 80 or 17 and 18 to the conductor extensions include masking the dielectric as it is applied in a powder or thick slurry which is fired in situ, or the layers can be machined by means of a laser beam, sonic source or like energy means.

Terminals 44, 45 and 46 for the *x* array and 50,51 and 52 for the *y* array are provided on the ends of cross connecting conductive strips 81, 82 and 83 and 84, 85 and 86 respectively. As in the case of terminals such as 41, these terminals can be formed with the cross connectors during their deposition; however, in order to increase their adaptability to external connections a sheet metal or foil overlay (not shown) can be superimposed on this region. An overcoat of dielectric (not shown) can be applied to the terminal strip regions 14 and 16 if it is deemed warranted for protection. Such a layer can be laid down as a powder or thick slurry, leaving the terminal faces free for electrical connections, and can be fired either separately or in conjunction with the assembly of the opposed substrate 24 and 25 into the display device 11.

A convenient construction for the device is to form array sub assemblies as described, join them together with proper spacing to define the desired gas volume thickness, fill the unit with gas and seal it. Dielectric layers such as 17 and 18 are formed of an inorganic material as adherent films or coatings which are not chemically or physically affected by elevated temperatures. One such material is a solder glass such as Kimble SG-68 manufactured and commercially available from the assignee of the present invention. This glass has a thermal expansion characteristic substantially matching the thermal expansion characteristics of certain soda-lime glasses suitable, when in plate form for support members 24 and 25. Dielectric layers 17 and 18 in the display area 12 must be smooth and have a dielectric strength of about 1000 volts per mil and be electrically homogenous on a microscopic scale (i.e. no cracks, bubbles, crystals, dirt, surface films or other irregularities). Also, the surfaces of dielectric layers 17 and 18 in the display area should be good photoemitters of electrons to enable priming or conditioning of the cells for transfer to an on state of discharge. Alternatively, dielectric layers 17 and 18 may be overcoated with materials designed to produce good electron emission, as in U.S. Pat. No. 3,634,719 issued to Roger E. Ernsthausen.

Spacer 26 provides a hermetic seal for the volume containing gas 22. It can be formed as a bead enclosing display area 12 on one of dielectric layers 17 and 18 or directly on one of substrate 24 and 25. The bead 26 can directly contact portions of conductors 19 and 21 where no overlying dielectric layer is present. In assembling the $x$ and $y$ arrays into a display panel the bead 26 is fused to the opposed face, usually in a baking process. A tubulation (not shown) is provided through the spacer bead 26 to enable the interior of the panel to be flushed and filled with an appropriate ionizable gas. After filling, the tubulation is closed to seal the display area 12.

Utilization of the device 11 as a display panel having inherent memory involves connecting its conductors to suitable circuitry generally represented in FIG. 1. In operation the device is continuously subject to an alternating sustainer voltage from sustainer voltage source 87 through pull-up and pull-down busses 88 and 89 and 91 and 92 for the $x$ and $y$ arrays respectively. This sustainer is applied through a transistor-diode matrix 90 to $x$ and $y$ conductors at terminals 41 through 52.

According to one form of operation employing cell matrix inversion of discharge states by shift of the sustainer level, one component of the sustainer voltage applied to one array has a smaller transition between extremes than the sustainer component applied to the other array. For example, the $y$ conductors might normally have a sustainer component pulsating at regular periods between a reference level $V_G$ and a voltage $V_H$ above $V_G$ while the $x$ conductor sustainer component would pulsate between a value $V_L$ below the reference level $V_G$ and $V_H$ above the reference level $V_G$. In such an arrangement $(V_H - V_G) + (V_H - V_L) = 2\ V_s$ or about 220 volts. Typically $V_H$ is 70 volts above $V_G$ and $V_L$ is 110 volts below $V_G$.

Inversion of a cell matrix discharge state energized by a sustainer of the above type is by an interchange of sustainer components between the arrays so that the $y$ array is pulsed periodically between a value $V_L$ below reference $V_G$ and a value $V_H$ above the reference while the $x$ array is periodically shifted between $V_H$ and $V_G$. Such sustainer pulsations can be applied at a frequency of 50 kilohertz for both normal and inversion producing levels. The inversion shift places the wall voltage of off cells at a sustainer augmenting value sufficient to initiate discharges in those cells and places the wall voltage of on cells at an off state level relative to the shifted sustainer.

Figure 3:
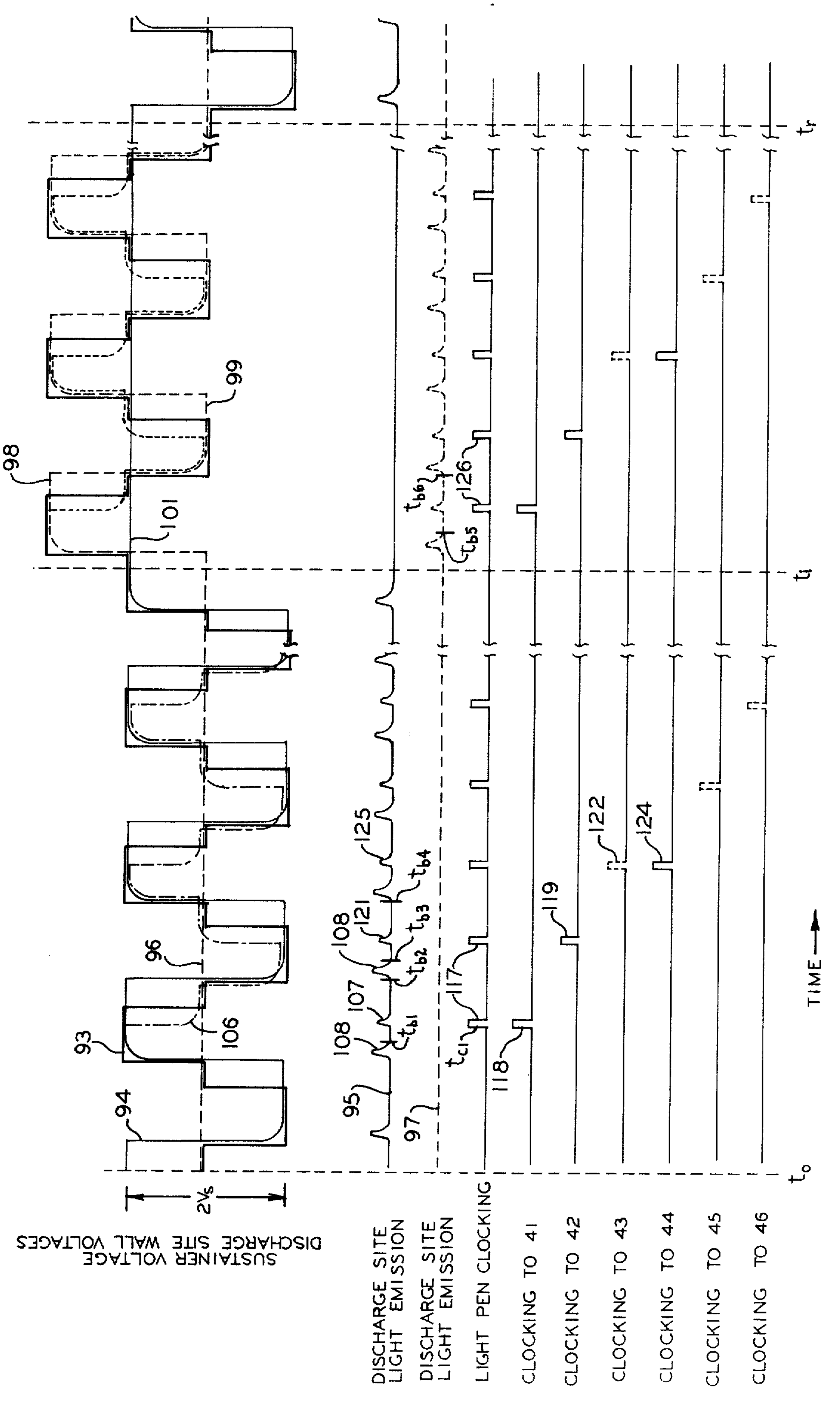
FIG. 3 is a plot against time of sustainer waveform, cell wall charge, light emission, and matrix scan signals for one coordinate, for practicing the method of the invention as illustrated in FIG. 1.

As shown in FIG. 3 a acomposite sustainer wave form 93 as made up of the components applied to the $x$ and $y$ conductor arrays can appear as shown with a series of normal sustainer cycles from time $t_0$ until the shift of sustainer levels to invert the cell matrix at time $t_i$. An inverted state is maintained until the matrix is reinverted to a normal sustainer level at time $t_r$. Wall voltages 94 for cells in the on state of discharge during the normal sustainer mode of operation have transitions which occur incidental to each major transition of the sustainer voltage over the value 2 $V_s$ as at times $t_{b1}$, $t_{b2}$. Each wall voltage transition for on state cells during the normal mode is accompanied by a burst of light due to ionization discharge of the gas in the sites which are in an on state as shown by the solid line plot 95 of site light emission. Sites in an off state of discharge during the normal mode have a wall voltage as shown by the dashed line 96 and, when inverted to an on state by imposition of the inversion mode sustainer, a light emission plot as represented by dashed line 97. It will be noted that the shift of the sustainer voltage at time $t_i$ places the wall charge of off sites at or essentially at the level, relative to the next major sustainer transition, which is equivalent to the relationship of an on state site to the normal sustainer transitions. Accordingly, the applied shifted sustainer is augmented by the wall voltage of the normally off cells to the voltage which ignites a discharge in those cells as represented by the wall charge transition to 98. Thereafter, during the inverted sustainer voltage transitions the normal off sites are discharged at a level between level 99 and level 98. Normally on sites have a wall voltage at time $t_i$ which is related to the shifted sustainer wave form as normally off sites are related to the normal wave form, as shown at level 101. These normally on sites do not have sufficient wall voltage during application of the shifted sustainer to augment that shifted sustainer to a discharge ignition level, hence the sites remain off.

Selective manipulation of discharge states for the cells is achieved by superimposing voltages on the sustainer components in proper synchronism with those components. Discharge terminating manipulations can be employed with the described assymetric sustainer components in a system arranged for inversion of the cell matrix. Such manipulations involve opposing the sustainer components, as by pulling the addressed discharge site conductors in each array to or toward the reference level $V_G$ so that an on state of discharge is terminated by discharging the wall charge to an off state. A sub site can be written by an erase signal addressed to it while it is inverted by cell matrix inversion to the on state and can be erased by an erase signal addressed to it while it is written and is operating in its normal sustainer operating mode.

The manipulation of the sub sites is selectively controlled from the user interface 103, which may be a computer or other suitable source of information to be displayed, through selection logic 104 which decodes the information to cell location and the type of cell manipulation desired, and to control logic 105 which clocks manipulating signals in proper synchronism with its clocking of the sustainer voltage. The manipulating signals termed "partial select signals" can be developed by normally open switches such as transistors in the transistor-diode matrix 90 arranged so that p-n-p transistors pull up an addressed conductor in the array then subjected to a sustainer voltage below the reference level and n-p-n transistors pull down an addressed conductor in the array then subjected to a sustainer voltage below the reference level and n-p-n transistors pull down an addressed conductor in the array subject to a sustainer voltage above the reference level. A pull-up and pull-down erase pulser is coupled to each of terminals 41 through 52 from transistor diode matrix 90.

While the connectors coupling a plurality of conductors in an array in parallel pass the erase partial select pulse for a cell to be manipulated to sub sites of all other sub sites having a portion of one of those conductors as an electrode, in normal erasing of cells only one cell will transfer its state in response to operation of any given combination of four erase pulsers.

The effect of interconnecting the conductors in each array in sets enables a unique combination of an *xa*, *xb*, *ya* and *yb* pulser to be established for each cell in the matrix of cells of the panel. If the array conductors are assigned numbers 19-1*a* through 19-9*b* through 19-9*b*, 21-1*a* through 21-9*a* and 21-1*b* through 21-9*b* and are connected with the *xa* and *ya* conductors of three adjacent paired conductors and the *xb* and *yb* conductors of every third conductor pair in parallel, six pulsers are employed to uniquely select nine lines in each axis and 12 pulsers select 81 unique cell sites. Where a nine bit binary input provides 512 distinct signals and that number of lines are provided in a coordinate of a display panel, the two set system employing two conductors per line conveniently decodes with 32 pulsers each connected through display connector lines to 16 panel conductors for one set and with 16 pulsers each connected to 32 panel conductors for the other set.

The number of pulsers are paralleled conductors required to produce a given number of unique conductor pairs can be reduced further where all possible combinations of the conductors in an array are utilized. Effectively in the illustrated structure each of the three pulsers for the *a* set of conductors should have their conductors uniquely paired and each of the conductors in the *b* set should similarly be combined. If there are $N_x$ coordinate locations in the *x* dimension and $N_y$ $_a$coordinate location in the *y* dimension in the display and double conductors are employed for each location, there will be $2N_x x$ conductors and $2N_y$ *y* conductors in the display/memory panel grouped in pairs for each axis. When *n* voltage pulse sources per axis, the maximum number of lines L per axis which can be uniquely selected is $n\ (n-1)/2 = L$, i.e. the number of combinations of *n* things taken two at a time. In FIG. 1 *n* is six and 15 unique pairs of conductors could have been illustrataed as lines in both the *x* and *y* axes, had all possible pairings been employed and had space permitted. This would have afforded 225 unique cells in the matrix addressed by 12 pulsers. Where 512 unique paired conductor lines were desired, the minimum number of pulsers and display connector lines to the array is 33. It should be noted that these reductions in the number of pulsers lead to more complex encoding and decoding for addressing purposes.

In actuating *xa*, *xb*, *ya* and *yb* pulsers for a unique for discharge sub site cell of the matrix a number of cell sub sites will be subject to the erase signals without altering the state of a cell in the on state since the least one of their sub sites will not be erased and will reignite the entire cell in the next half sustainer cycle. Thus there will be some coordinate locations which have one, two and three sub sites of the four that could be erased or transferred to an off state of discharge, leaving at least one which is not and is effective as a control sub site to reiginate to the on state those which were erased. As described above, where this writing of a unique cell by addressing the matrix through the pulsers for the four conductors unique to the cell is practiced in a normally off field of cells, the matrix of cells is inverted to place the field of off cells in an on state, the addressed cell is erased, and the matrix is reinverted so that the addressed cell is in an on state with the other originally off cells returned to their off state.

It is to be recognized that the number of conductors over each coordinate location of any array can be more than two and need not be equal in each array. That is there could be three or more conductors having portions so proximate each other and at least one conductor in the opposed array that spatial discharge transfer is realized between the sub sites defined by each pair of proximate conductor portions in opposed arrays. For example each cell can be formed with an *x* array conductor portion and three or more *y* array conductor portions, or each cell can be formed with three or more proximate conductor portions in each array.

The combinations of discharge sub sites to achieve spatial discharge transfer can be with a single conductor in one array and grouped conductors in the other array as where the discharge cells are in alignment along the single conductor as paired sub sites where the second array has paired proximate conductor portions as the conductor groupings. More commonly the cells are in a matrix having width and length where plural conductors are in each array. Again while only one array need have grouped conductors forming proximate conductor portions for spatial discharge transfer within the cell it is advantageous to have both arrays so arranged. Each conductor can have a plurality of regions spaced along its length in its array providing proximate conductor portions forming the electrodes of discharge sub sites. Cell electrodes or proximate conductor portions can be connected in electrical parallel as well as series connections in the cross point or grid matrices shown and maintain unique discharge sub site combinations for individual cell control where erase writing techniques are utilized.

Since coincident erasure of all sub sites of a cell is necessary to erase a cell, unique writing of a cell is accomplished by inverting the discharge state of the matrix, as by actuating control logic 105 to interchange the sustainer component waveforms applied to the *x* and *y* arrays of conductors to shift the resultant sustainer level to turn on those cells normally off without loss of memory of previously written cells since they are turned off by the invertion. The coincident erase signals are then applied to the selected cell as determined by selection logic 104 and synchronized with sustainer voltage transitions in control logic 105 to activate the two pull up pulsers for the two conductors of the cell for the array at a low potential, $V_L$ in the illustration, and the two pull down pulsers for the two conductors of the cell for the array at the high potential $V_H$ whereby all four sub sites of the selected cell are erased. As noted above the other sub sites made up from portions of the conductors of the erased cell sub sites will also be erased by these functions however since an on memory is retained in those other cells by the retention of at least one sub site in an one state those cells with be reignited in the next half sustainer cycle. Reinversion of the matrix places the newly erase writtern cell in an on state and returns any previously written cells to an on state while returning the background cells to an off state.

The capacity to cause a change in discharge state which is detectable from the device exterior without loss of the memory of the state of discharge in the cells within the filed of the detector is utilized in the present system for light pen purposes. According to this system a portion of a selected cell or, more effectively, a portion of each of a plurality of selected cells is transferred from an on state of discharge to an off state selectively and then returned to the on state by a control sub site of the cell or cells. The ionization discharge of an on state sub site issues a light burst which is detectable.

As shown in FIG. 3 for the wall voltage plots of sites in the on state of discharge, an erase of an on state site results in a reduction in wall voltage along the dodashed curve 106 to an off state wall voltage level which is at or near the lever 96 of normally off sites. A light burst is emitted in the erased site as a result of this discharge as shown at 107 on curve 95. That burst is represented as of lower magnitude and shorter duration than the burst 108 for an on site which normally accompanies a sustainer major transition.

In operation, an on state discharge site issues a burst of light 108 at each of the two major transitions of the sustainer voltage in each sustainer period. These light bursts are of about 500 nanoseconds duration and are spaced by normally non-light-emitting intervals of about 91 microseconds, as by the intervals between $t_{b1}$, and $t_{b2}$ and between $t_{b3}$ and $t_{b4}$, in a typical 20 microsecond sustainer period. Erase signals effective on on sites, if imposed during the normally non-light emitting intervals can be detected selectively by appropriate enabling of a light detector 111, FIG. 1, during those intervals.

Light detector 111 has a sensing device 112 or pick up means having a limited filed of detection, the circular area 113, relative to the cell matrix area is positioned on the display panel face 12 overlying the matrix. The light bursts for a discharge to an off state are developed in the normally non-light-emitting interval between the light-emitting intervals for one state cells. A light pen thus has the capacity to identify coorindates of a cell in a region encompassed by its field of detection by the gating of its response only during normally non-light emitting intervals. This detection is significant in identifying the location of field 113 on panel 12 since the matrix of cells is selectively scanned with non-destructive erase signals applied to discrete and identifiable individual cells or groups of cells. When the non-destructive erase signal coincides with the light pen location, the scan position is marked. This may be an individual position on a coordinate or one of a group of possible positions on a corrdinate. If it is identified as an individual position, the scan of non-destructive erase signals can be made on the other coordinate until that coordinate is identified. If the identification is one of a plurality of positions further non-destructive erase signal scanning on a different basis is undertaken to idenify the coordinate and where the other coordinate is unknown its scanning is then undertaken.

A restoration of cell discharge state by the control of one or more sub sites in the cell can be made only for the on state in the example. Thus, non-destructive erase signals are employed in the light pen function and are effective to cause a detectable discharge only upon those cells which are in the on state on discharge when scanned. Thus, the state of discharge of the cell can be deduced, as an incident of detection that it is being scanned, by virture of the mode of the sustainer voltage wave form imposed across the cell matrix. It a normal sustainer voltage is present, the detected cell is in an on state of discharge. If no scan is detected when the matrix has been scanned in one coordinate it indicates to cell to be identified in the filed of detection 113 is in an off state of discharge when subjected to the scanning signal. The system can be programmed to invert the matrix as by shifting the sustainer level to turn all cells normally off to the on state of discharge and then scan the inverted matrix with non-destructive erase signals. When the cell's coordinates are identified in the inverted matrix scan its state is indicated as an off state cell.

The sensing device 112 is of a size and form which can be positioned manually on the panel face 12 at any desired location and can include a suitable radient energy responsive element (not shown) for the frequency band of emission of the panel in the cylindrical body of device 112 or a suitable transmission system to transmit light through conduit 114 to a radient energy responsive element in detector 111.

Detector 111 is gated by control signals from control logic 105 passed over conductor 115. Since control logic 105 controls the clocking of the sustainer voltage, it can define the normally non-light-emitting intervals of operation and issue clocking signals to the light detector 111 and to the selection logic 104 to synchronize those signals dictated to the selection logic by the programs of the scanning control. Marking means and scanning control 116 control the selective application of non-destructive erase siganls to the conductors of the panel arrays.

Clocking pulses from control logic 105 are illustrated on the time base employed for the sustainer in FIG. 3. When light pen operation is instituted, as by a signal imposed at the user interface 103, the read and erase functions for information display are inhibited (by means not shown) and the clocking pulse train and scanning program of the marking means and scan control 116 are instituted as at time $c_{cl}$. This time is coordinated with the sustainer voltage wave form such that the wall charge of on state sites has an adequate interval in which to stabilize, i.e. the knee of curve 94 is completed or essentially completed. In addition to enabling the light detector within the normally non-light-emitting interval the clocking pulses 117 also actuate the seqencing of the scan and the gating of non-destructive erase signals.

While many scan sequences can be employed, the sequence illustrated in FIG. 3 as applied to FIG. 1 involves a scan of the $x$ coordinates until the light pen is located in one of the three groups of three parallel adjacent rows of cells to which terminals 41, 42 and 43 are connected. Then the scan identifies which row of cells in the identified group is beneath the light pen to complete identification of the $x$ coordinate. This is done by identifying which of terminals 44, 45 and 46 is coupled to the row location of the light pen 112. The $y$ coordinate is next identified by a sequence which repeats that set forth above by scanning terminals 47, 48 and 49 coupled to grouped adjacent columns of cells grouped for every third column. These scan sequences are performed while a normal sustainer waveform is imposed. If no scan was detected upon the completion of the first scan of the $x$ coordinates, that is the scan of terminals 41, 42 and 43, it would indicate that the cell in the area interrogated by the light pen is in an off state of discharge.

In order to scan for a cell in an off state of discharge, the cell matrix is inverted by a sustainer voltage level shift as at time $t_i$ of FIG. 3. This shift is controlled by marking means and scan control 116 which then institutes the same scan sequence set forth above. This sequence is represented beyond the break in time on the time axis of FIG. 3.

Consider the light pen positioned as shown in FIG. 1 over cell 19-4, 21-5 with the cell in an on state of discharge. In accordance with the above scan sequence control 116 applies an erase pulse to at least one $y$ conductor of every cell in the matrix as to terminals 47, 48 and 49 of the $y$ array for each $x$ scan pulse. Thus, at time $t_{e1}$, pulse 118 is applied to terminal 41 and thereby to conductor 19-1a, 19-2a and 19-3a. Any one state cells is rows 19-1, 19-2 or 19-3 will have their sub site defined by the $a$ set of $x$ conductors and the $a$ set of $y$ conductors erased with a reduction in wall voltage as generally shown at 106. Light will be emitted from each such sub site as at 107 without effect on the light detector 111 since the light will be outside the field 113 of light pen 112. As the sustainer makes its transition to its most negative excursion, at time $t_{b2}$, the three on state sub sites of each cell which had a sub site erased in the light pen interrogating scan will have that erased sub site rewritten by spatial discharge transfer so that all sites of the cell will be in an on state of discharge.

Control 116 then shifts to apply a non-destructive erase to terminal 42 and terminals 47, 48 and 49 during the next normally, non-light-emitting interval to erase the sub sites of all on state cells which are defined by the $a$ set of $x$ conductors and $a$ set of $y$ conductors in rows 19-4, 19-5 and 19-6 in response to pulse 119. Sub site 19-4$a$, 21-5$a$ will emit a light burst as 121 which will be picked up by 112 and detected by detector 111 to pass a marker signal to marking means and scan control 116. Control 116 identifies the scan as being located in one of rows 19-4, 19-5 or 19-6 and can terminate further scanning of the a set of conductors without applying pulse 122 to terminal 43.

A more detailed scan of rows 19-4, 19-5 and 19-6 is made by scanning the $b$ set of $x$ conductors for those rows through application of non-destructive erase signals. The next clocking pulse is programmed by control 116 to issue erase signals to at least one $y$ conductor of each column of cells as a terminals 47, 48 and 49 and the first row of cells in each group of three adjacent rows of cells in the $x$ array at terminal 44 as by pulse 124. A light burst 125 results from the discharge to an off state of sub site 19-4$b$, 21-5$a$ and actuates detector 111 through sensor 112 to issue to a marker signal to marking means and scan control 116 identifying the $x$ coordinate as the first row in the second group of adjacent rows, i.e. coordinate 19-4. While the control 116 could be programmed to complete its scan of the $x$ array terminals, the more efficient program is to proceed with identification of the $y$ coordinate of the light pen interrogated area 113. Control 116 individually pulses the grouped $y$ conductors while pulsing an $x$ conductor of each cell. Where the grouped adjacent conductors are scanned first, the non-destructive erase pulses are applied to terminal $y$ array 47 and $x$ array terminals 41, 42 and 43 without effect on the light pen. When terminals 48 and 41, 42 and 43 are pulsed, sub site 19-4$a$, 21-5$a$ emits detected light. This identifies the pen location as in the second group of adjacent $y$ array conductors. The conductor in that group is then identified by pulsing terminals 50 and 41, and 43, without effect, to eliminate the first column on the left of the group. The pen interrogation is fully located when terminals 51 and 41, 42 and 43 are pulsed to erase sub site 19-4$a$, 21-5$b$ and thereby actuate detector 111.

Next assume that a scan of the $x$ coordinates had failed to actuate the light detector. This condition would occur if the area interrogated was in an off state of discharge and therefore non-responsive to the non-destructive erase signals of the scan. Scan control 116 is effective when no non-destructive erase light pulse is detected during a normally non-light-emitting interval for a completion scan of all cells of the matrix, as a completion of a scan of terminals 41, 42 and 43 for example, to shift the sustainer voltage through actuation of the selection logic 104 to the control logic 105 to the sustainer voltage control 87, whereby the matrix of cells is inverted in their discharge states during the interval $t_i$ to $t_r$. Off state cells with thus be on with wall charge waveforms as shown in dashed lines. Control logic 105 issues clocking pulses 126 to actuate issuance of non-destructive erase signals during normally non-light-emitting intervals as $t_{b5}$ to $t_{b6}$, in a programmed sequence as outlined above. The $x$ scan will be for terminals 41, 42 and 43 until the group of adjacent lines of cells containing the area interrogated is identified, then terminals 44, 45 and 46 until the line in the group is indicated. The $y$ scan would then be made.

Upon completion of identification of coordinates and the state of the cell in the interrogation region, the scan control 116 will return to a normal sustainer wave form having first issued the desired light pen information to the user interface 103.

As noted , light pen operation employing spatial discharge transfer for memory retention, imposes non-destructive erase on each of the sub sites of the cell interrogated to identify the cell's coordinates. While scanning could be performed sequentially along each coordinate with but one line of cells subject to non-destructive erase during each normally non-light-emitting interval, such scanning would consume excessive time for many applications. A typical matrix is composed of 512 lines of cells in the $x$ and $y$ coordinates. Thus, single line scanning with a 50 kilohertx sustainer wave form providing one scan step every ten microseconds would require 20.48 milliseconds, since a completed scan could require each axis be scanned in the normal and inverted mode. A more efficient scan of groups of cell lines can be performed with sixteen groupings of 32 adjacent lines connected in parallel and 32 groupings of sixteen lines spaced every 32 lines in the array. This requires 48 terminal scans for each array according to the illustrated scheme. A complete scan using this system consumes 1.92 milliseconds. An even more efficient combination employing the minimum number of parallel groupings of conductors in all combinations taken two at a time requires only 33 terminals for 512 unique paired combinations of conductors and a scan can be completed in 1.32 milliseconds.

Figures 4, 5:
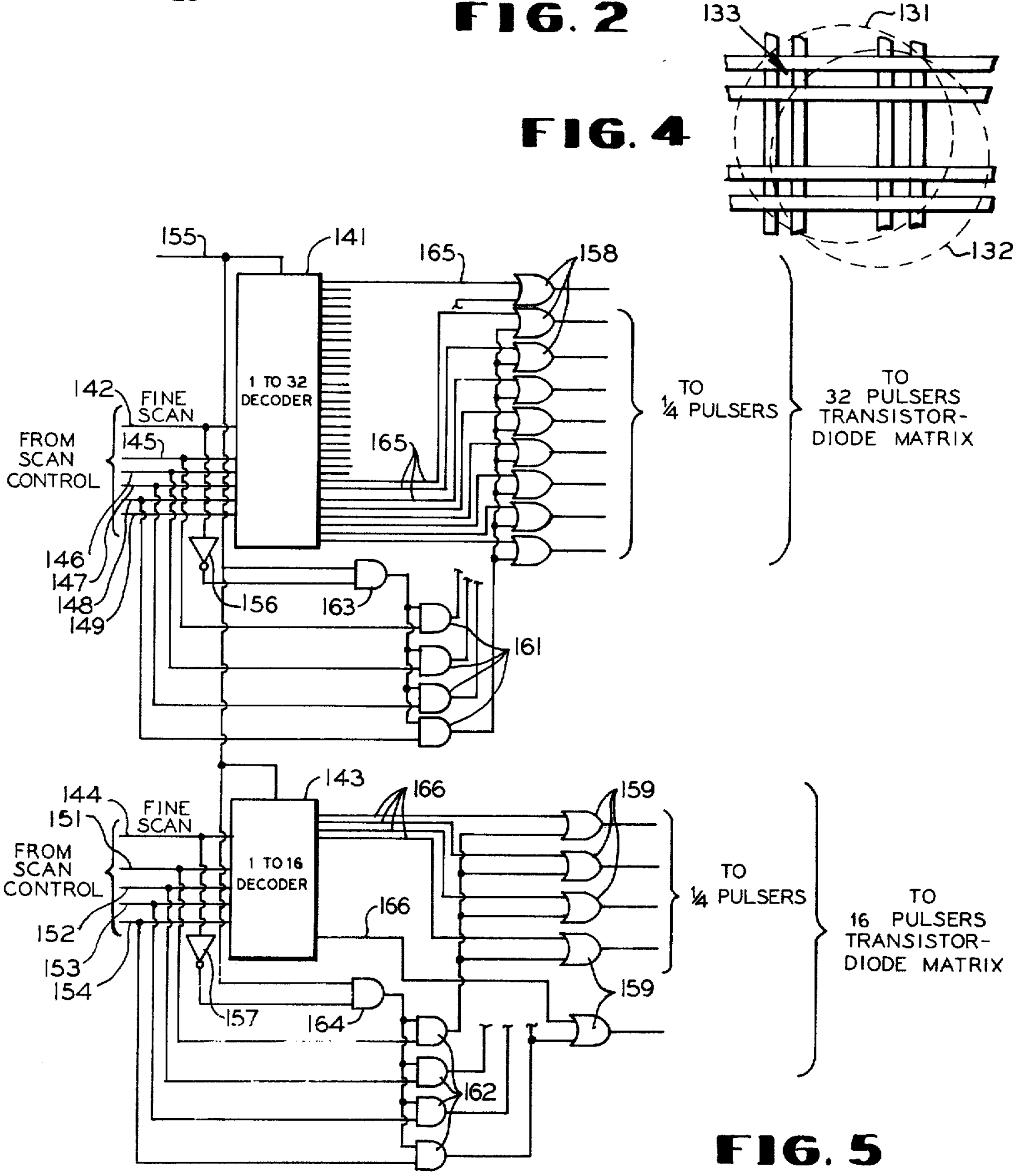
FIG. 4 is an enlarged view of four cells of a matrix of four sub site cells illustrating light detector field for cell identification.
FIG. 5 is a logic diagram of the selection logic employed for course block scanning and fine scanning according to this invention.

In order to be assured of picking up all sub site discharge of at least one cell, the field of the light pen should encompass the area of four cells. As shown in FIG. 4 the dashed circular line 131 representing the light pen field 113 when centered between four cells embraces all four sub sites of all cells. If placed at any other position on this grouping, as for dashed circle 132, at least one cell will be completely within that field. A smaller field 113 could have a placement such that no cell is completely within it. Thus, in the example of cells on 16 mil centers with three mil wide conductors spaced three mils in each cell, a field of 17.7 mils radius is desirable.

Placement of the light pen can encompass as many as four cells within its field. In order to define a single cell upon which the pen is effective, an arbitray sequence of detection is established within scan control 116 in accordance with the scan sequences. Thus, if cell 133 is on the left-side of the field and is the uppermost therein it is the first scanned in a top to bottom scan sequence of the $x$ coordinate and is the first scanned in a left to right scan sequence. The program control is arranged to stop on the intial identification in each scan and therefore identifies that cell. In the exemplary scan, the sub site sequence of scanning will exclude identification of a cell only partially within the field and in the upper left quadrant thereof, as cell 133 relative to field placement 132, since it is the upper-left sub site which is non-destructively erased for each cell, and that sub site is outside the field.

Another consideration of the scan validity for a large light pen field is that of an interrogation area encompassing two different cell groupings, as would be the case in FIG. 1 if field 113 encompassed a cell in each of rows 19-3 and 19-4. Again where the sequence of scan is for adjacent cell rows grouped with each having parallel connected conductor in the group and is from top to bottom, the first group scanned when a non-destructive erase pulse is applied to terminal 41 will indicate the region in which the field is located. In the illustrated scan program the scan of adjacent parallel groups is terminated when a cell is detected hence no confusion would arise due to a detected cell for a scan of the second group. When the cell row number is scanned for the $x$ coordinate as by scanning terminals 44, 45 and 46 the first detection of a cell would indicate a first row cell. This would incorrectly identify row 19-1 as the field location. If a scanning sequence is dicated in which false identifications of coordinates can be made, the condtions which give rise to such indications should be arranged to perform sub programs to avoid the potential errors.

One check program of scan for the above noted error conditon would be to require a scan at both ends of the row count when either end is detected, and if both ends are indicated to have cells in the field of interrogation 113, to require a check of both the first and last detected group of adjacent rows at its next preceding and next following groups, terminals 41, 42 and 43 in the example. The logic employed by the program can then be arranged to identify the cell as in the last row of the first group, row 19-3 as originally assumed for the example.

The addressing scheme illustrated in FIG. 1, wherein each line of an axis is uniquely defined by signals at two terminals and where the conductors for sub site components of the cells are paralleled for adjacent rows as groups and regularly spaced rows as the number in the groups, can be made more efficient if large regions of the matrix of cells are simultaneously subjected to non-destructive erase signals. This either identifies or eliminates regions to be scanned more rapidly and enables the number of scan steps to be reduced. For example, in a 512 line per axis cell matrix made up of 16 groups of 32 parallel conductors comprising half lines of adjacent cell rows, and 32 groups of 16 parallel conductors comprising half lines of every 32nd cell row, a coarse scan might be made of one quarter of the matrix at a time by scanning the 16 groups four at a time. Upon detection of a non-destructive erase pulse, the quarter of the matrix area over which the light pen is located would be identified. Furthermore the quarter of the rows over which the pen is located could also be identified in a coarse scan of the 32 groups by applying non-destructive erase pulses to those groups in blocks of eight groups. With these techniques, the fine scan of one of the four groups having 32 parallel conductors comprising half lines of adjacent cell rows and one of the eight groups and having 16 parallel conductors comprising half lines of every 32nd cell row can be subject to a fine scan to identify the cell row or coordinate.

FIG. 5 shows in fragmentary form the logic diagram for a system of coarse and fine scanning of a 512 by 512 line panel. The diagram represents a decoding portion of the selection logic 104 which responds to binary signals from the programmer of scan control 116 passed through the user interface 103 to selection logic 104. An 11 bit binary code can be employed where the first bit is a fine scan for the 1 to 32 decoder 141 on lead 142, the second bit can be a fine scan enable for the 1 to 16 decoder 143 applied on lead 144, the next five bits are for the non-destructive erase pulsing controls to the 32 groups as at leads 145 through 149 and the four remaining bits are for the 16 groups as at leads 151 through 154. The "true" signal for all such bits can be considered a logic 1 at the inputs although the diagram otherwise has been portrayed with only logic functions considered and without regard to the sign of the signals developed in the logic elements.

Each non-destructive erase signal involves a pulse to at least one conductor for each cell in the arry opposite the array being scanned. FIG. 5 considers only those controls for the non-destructive erase signal pulse selectively applied to conductors in the scanned array. It is to be appreciated that known logic can be employed to exchange signals whereby the logic elements of FIG. 5 are employed for scans of both the $x$ and $y$ arrays for both the normal and inverted sustainer voltage levels of operation. This exchange is permitted where the addressing pulsers employed are pull up and pull down pulsers connected according to the disclosures of U.S. Pat. application Ser. No. 372,549 filed June 22, 1973, in the name of Jerry D. Schermerhorn entitled "Circuits for Driving and Addressing Gas Discharge Panels by Inversion Techniques" (Case S-13030). More particularly, p-n-p transistors function as pull up pulsers to pull array conductors below a reference level toward that level and n-p-n transistors are pull down pulsers to pull array conductors above the reference level toward the level. The emitters of these transistors can be connected to the reference value or some value in that range while the collectors are connected through isolating diodes to the display device array conductor terminals to correlated conductors in both arrays. Control of the pulsers functioning as a normally open switch is by TTL signals to the transistor bases to effectively close the switch and apply the signal at the emitter to the conductor of the array for which the sustainer voltage wave form has established the required voltage level.

Since the same pulsers are applied to corresponding $x$ and $y$ array conductors the same controls for those pulsers can be employed if properly correlated in their operation with the sustainer voltages imposed. The control logic 105 by its clocking achieves this control on lead 155 to gate decoders 141, the 1 to 32 decoder, and 143, the 1 to 16 decoder, where a fine scan operation is effective as determined by enable signals on lead 142 or 144 from the scan control 116 or to a coarse scan control through inverters 156 or 157.

Pulser control signals are issued by ORs 158 and 159 either in groups in response to ANDs 161 and 162 enabled by ANDs 163 and 164 or individually in response to individual output signals on decoder output leads 165 and 166.

Consider a coarse scan first of the 16 groups of 32 parallel half lines of adjacent lines of cells (corresponding to terminals 41, 42 and 43 or 47, 48 and 49 in FIG. 1), that scan being made four groups at a time. Fine scan signal on lead 144 is a 0 or "not" and by inverter 157 enables clocking AND 164 while inhibiting decoder 143. Control logic 105 clocks AND 164 with a 1 on lead 155 so that AND 164 enables each of the group selection ANDs 162. The scan control 116 issues a selecting signal on one of leads 151, 152, 153 or 154 as determined by its coarse scan program. Assume lead 151 has an enabling signal for the uppermost group selection AND 162 to gate the group of four ORs 159 also connected to the first four outputs of decoder 143. Each of these ORs 159 actuates a pulser so that one quarter of the cell matrix receives a non-destructive erase signal. If the light pen 112 is located on that quarter it actuates the marking means and scan control 116 to shift to another scan program, if not, the next quarter of the matrix is subjected to a non-destructive erase by the next cycle of the current program when the signal on lead 152 is in an enabling state.

The next scan program can be a fine scan of the 16 groups in the area identified by the coarse scan, i.e. groups 1 through 4 in the example. A 1 is applied on lead 144 from scan control 116 to enable decoder 143 and by inverter 157 inhibit AND 164. Binary signals for groups 1 to 4 are issued by scan control 116 on leads 151, 152 and 153 in separate scan cycles so that the first through fourth outputs leads 166 of decoder 143 gate the first through fourth ORs 159 in response to clocking signals on lead 155 to pulse the corresponding panel pulsers. When the conductor group is detected by the light pen 112 the set of 32 pulsers are scanned under control of a program from scan control 116.

A coarse scan of the 32 pulser grouped in four groups of eight pulsers is accomplished as set forth above with an enable signal on lead 142 through inverter 156 to AND 163 and clocking signals on lead 155 to gate AND 161 are designated by enabling signals on leads 145, 146, 147 or 148 from scan control 116. If the pulsing in the lowest group actuates light pen 112 when the lowest eight ORs 158 are gated the next program, a fine scan of the selected quarter of the 32 groups, is undertaken. Fine scan signal 1 on lead 142 inhibits AND 163 and enables decoder 141 to respond to binary count selection signals on leads 145 through 149 and individually gate ORs 158 of the lowest group as the control logic issues clocking pulses to the decoder on 155 and the program advances the count. When the line of cells is identified the scan control 116 actuates the exchange logic (not shown) to accommodate the controls of FIG. 5 to the other axis and the other axis is similarly scanned to identify its coordinate in the light pen field.

The information derived from the identification of light pen position coordinates and the discharge state of the cell at those coordinates can be employed by the users equipment such as a computer beyond the interface to amend a program and/or to establish a control state for the display of the gas discharge device by either a write or erase manipulation of the cell in the light pen field. Other writing tablet functions can also be performed employing the present form of light pen.

It is to be appreicated that this method of array coordinate-identification by selectively creating localized light bursts during normally non-light-emitting intervals and gating a detector to sense only light emitted during normally non-light-emitting intervals and correlating the applied signal causing a detected burst with the coordinate can be practiced by non-destructive discharges other than those illustrated. For example, the sustainer voltage transitions selectively applied to localized regions of the cell matrix can be offset in the time axis with respect to the sustainer voltage applied to the remainder of the cell matrix without destroying the memory of the state of the cell and can be detected by selective enabling of a detector during a time window conicident with that offset. Further, the sequence of scan locations need not follow the patterns illustrated above. Identification of a coordinate along but one axis can provide useful information for some applications. In cases where spatial discharge transfer functions are relied upon to retain memory of a cell by a control sub site which is not erased, the control sub site could be provided by conductor arrays other than those set forth. In view of the variations which suggest themselves to one skilled in the art from the detailed disclosure set forth above, it is to be understood tha the disclosure is to read as illustrative of the invention and not in a limiting sense.

What is claimed is:

1. A method of ascertaining the location of a gaseous discharge display/memory cell in a matrix of such cells, each cell comprising proximate portions of conductors in each of two conductor arrays, an ionizable gas volume in the vicinity of the proximate conductor portions, and a dielectric layer separating at least one conductor portion from said gas volume, each cell having at least two electrically independent conductor portions in one array in sufficient proximity to each other and to the cell's conductor portion in the second array to form plural discharge sub sites between conductors of the respective arrays such that an on state of discharge in any sub site of the cell causes an on state of discharge in the remaining sub sites of the cell, said method comprising the steps of:

applying a sustaining potential waveform across the two conductor arrays;

sequentially creating light emiting discharges in selected sub sites of the matrix during dormant time periods of cell response to the sustaining potentials while maintaining the internal information content of the cells;

detecting light emitted over a restricted area of the matrix during the dormant time periods of cell response to the sustaining potentials;

and restricting the light emitting discharge in selected cells of the matrix during dormant time periods of cell response to less than all sub sites of each selected cell.

2. The method according to claim 1 including the step of scanning the cell matrix with the sequentially created light emitting discharges.

3. The method according to claim 1 wherein the conductors of one array lie in a first surface and extend generally along one axis and the conductors of the other array lie in a surface equally spaced from the first surface and extend generally along another axis to define at the proximate conductor portions of each cell cross points with the conductors of the one array as viewed along mutual perpendiculars to the arrays, wherein the step of sequentially creating light emitting discharges is practiced first transverse of one array and then transverse of the other array whereby the light detection, and correlation of light emission with the location of the selected cell is transverse of each array.

4. The method according to claim 1 wherein the matrix of cells extends along two axes transverse to each other and including the step of scanning the cell matrix along one of the axes with the sequentially created light emitting discharges whereby detection of a discharge indicates the coordinate of the matrix along the one axis of the restricted area of detection.

5. The method according to claim 4 including the step of scanning the cell matrix along the other of the two axes with the sequentially created light emitting discharges whereby detection of a discharges whereby detection of a discharge inicates the coordinate of the matrix along the other of the two axes of the restricted area of detection.

6. The method according to claim 1 wherein the step of creating light emitting discharges is applied to cells in the on state of discharge.

7. The method according to claim 2 including the steps of:

shifting the level of the sustaining voltage waveform applied across the two conductor arrays whereby the state of discharge of all cells in the matrix is inverted and the wall voltage of cells in the on state of discharge is at a level relative to the shifted sustaining voltage level of the wall voltage of cells in an off state of discharge and the wall voltage of cells in the off state of discharge is at a level relative to the shifted sustaining voltage level of the wall voltage of cells in an on state of discharge;

correlating the level of the sustaining voltage waveform with the detection of emitted light to indicate the discharge state, during application of the unshifted sustaining voltage, of the cell within the matrix restricted area subject to detection.

8. The method according to claim 7 wherein a detection of emitted light during application of an unshifted sustainer waveform indicates the cell is in an on state of discharge.

9. The method according to claim 7 wherein a detection of emitted light during application of a shifted sustainer waveform indicates the cell is in an off state of discharge.

10. The method according to claim 1 wherein each cell is comprised of a plurality of discharge sub sites having independent manipulating signal sources including the step of restricting the light emitting discharge in selected cells during dormant time periods of cell response to less than all discharge sub sites of each selected cell.

11. The method according to claim 10 wherein the matrix of cells extends as lines of cells along a first axis and the discharge sub sites of cells extend as lines of sub sites proximate to each other along the cell lines including the steps of electrically segregating lines of discharge sub sites common to cell lines; grouping a line of discharge sub sites of each cell in respective first and second sets; electrically paralleling a plurality of discharge sub site lines of the first set and the second set into a plurality of sections of sub site lines, each cell lin including lines of discharge sub sites from a unique combination of the first set sections and the second set sections; scanning the first set sections with the sequentially created light emitting discharges, whereby detection of a discharge indicates the first set section location of the restricted area of detection; scanning the second set sections with the sequentially created light emitting discharges, whereby detection of a discharge indicates the second set section location of the restricted area of detection and, in combination with the first set section indicated, the unique combination of first and second set sections of a coordinate along the first axis.

12. The method according to claim 11 wherein the first set sections are divided into divisions comprising a plurality of set sections and the scanning of the first set sections is performed as a coarse scan of the divisions, whereby detection of a discharge indicates the division including the first set section location of the restricted area of detection, and as a fine scan of the first set sections in the indicated division, whereby detection of a discharge indicates the first set section location of the restricted area of detection.

13. The method according to claim 12 wherein the second set sections are divided into second divisions comprising a plurality of set sections and the scanning of the second set sections is performed as a coarse scan of the second divisions, whereby detection of a discharge indicates the division including the second set section location of the restricted area of detection, and as a fine scan of the second set sections of the indicated division, whereby detection of a discharge indicates the second set section location of the restricted area of detection.

14. The method according to claim 10 wherein the light emitting discharge in selected cells during dormant time periods of cell response is produced by the step of applying an erase signal to discharge sub sites of selected cells which are in the on state of discharge.

15. The method according to claim 14 including the steps of inverting the state of discharge of all cells in the matrix by shifting the level of the sustaining voltage waveform; sequentially creating light emitting discharges in selected cells of the matrix during dormant time periods of cell response to the shifted sustaining voltage; and correlating the level of the sustaining voltage waveform with the detection of emitted light to indicate the discharge state, during the application of the unshifted sustaining voltage, of the cell within the matrix restricted area subject to detection.

16. The method according to claim 14 including the step of returning the erased sub sites to the on state of discharge by spatial discharge transfer during the major transition of the sustainer voltage waveform next following the erase signal.

17. A system for identifying the location of a discharge cell in a gaseous discharge display/memory device having a matrix of discharge cells, each cell comprising proximate portions of conductors in each of two conductor arrays, an ionizable gas volume in the vicinity of the proximate conductor portions, and a dielectric layer separating at least one conductor portion from said gas volume, each cell having at least two electrically independent conductor portions in one array in sufficient proximity to each other and to the cell's conductor portion in the second array to form plural discharge sub sities between conductors of the respective arrays such that an on state of discharge in any sub site of the cell causes an on state of discharge in the remaining sub sites of the cell, means for applying a periodic pulsating sustainer voltage across said cells to cause periodic inoization discharges in cells which are in the on state of discharge, each periodic discharge being spaced apart by a normally non-light-emitting interval; means for selectively applying erase signals on selected sub sites of said cells during a selected normally non-light-emitting interval; a light pickup element having a limited area field of response; a light detector in communication with said light pickup element and responsive to light picked up from selected sub sites by said element only during normally non-light-emitting intervals; and marking means responsive to the detection of light by said light detector for marking the location of a cell which issued detected light from a sub site.

18. A system according to claim 17 wherein said matrix of cells comprises lines of cells extending along two axes and including scan control means to control the cell location of application of successive non-destructive erase signals along a first axis; and scan control means to control the cell location of application of successive non-destructive erase signals to different locations along a second axis.

19. A system according to claim 17 including means to shift said sustainer voltage level to invert the discharge state of the cells of the matrix; and means responsive to the sustainer voltage level imposed coincident with light detection by said light detector to indicate the state of discharge of the cell within the field of said pickup element when subjected to the unshifted sustainer level.

20. A system according to claim 17 wherein each cell is comprised of a plurality of discharge sub sites so spaced as to interact by spatial discharge transfer and including means to maintain the discharge state of one sub site of each cell to which said non-destructive erase signals are applied, whereby said one sub site of a cell in the on state of discharge returns its cell to its on state of discharge following application of said non-destructive erase signal.

21. A system according to claim 20 wherein said matrix cells comprise lines of cells extending along an axis and said lines of cells comprise at least two lines of discharge sub sites for each line of cells, parallel connections grouping sub sites lines of different cells into first and second sets of sub site lines and into respective pluralities of sections of sub site lines, each cell line including lines of sub sites from a unique combination of said first set sections and said second set sections; scan control means to control the sub site line locations of application of successive non-destructive erase signals to different sections of said first set sections; and scan control means to control the sub site line locations of application of successive non-destructive erase signals to different sections of said second set sections.

22. A system according to claim 17 including scan control means to control the cell location of application of successive non-destructive erase signals to different cell locations.

23. A system according to claim 22 wherein said scan control includes coarse scan means to apply successive non-destructive erase signals to different divisions of the cell matrix, each division including a plurality of cell locations; wherein said marking means marks the division in which is located the cell which issued the detected light; and fine scan means to apply successive non-destructive erase signals to cell locations within the division marked by said marking means.

* * * * *